May 6, 1924.

C. S. WHIPPLE

SINK STRAINER

Filed Dec. 23, 1922

1,493,305

Inventor
C. S. WHIPPLE

Fenelon B. Brock
Attorney

Patented May 6, 1924.

1,493,305

UNITED STATES PATENT OFFICE.

CLYDE S. WHIPPLE, OF NEWARK, OHIO.

SINK STRAINER.

Application filed December 23, 1922. Serial No. 608,771.

*To all whom it may concern:*

Be it known that I, CLYDE S. WHIPPLE, a citizen of the United States, residing at Newark, in the county of Licking and State of Ohio, have invented new and useful Improvements in Sink Strainers, of which the following is a specification.

The present invention relates to an improved sink strainer for use as a kitchen utensil, particularly adapted for the reception of waste materials from foods, or garbage, which accumulates from the meal table, and is designed for use as a temporary depository for such materials until the latter can be deposited in the usual garbage can.

The primary object of the invention is the provision of a device of this character from which liquids may be drained, and in which the solid materials may be retained for conveyance to the garbage can for deposit therein, thus affording a clean and sanitary utensil for the housewife.

The invention consists in certain novel combinations and arrangements of parts as will hereinafter be more fully pointed out and claimed.

In the accompanying drawings I have illustrated one complete example of the physical embodiment of my invention wherein the parts are combined and arranged according to an acceptable form of my invention for the practical application of the principles thereof.

Figure 1:
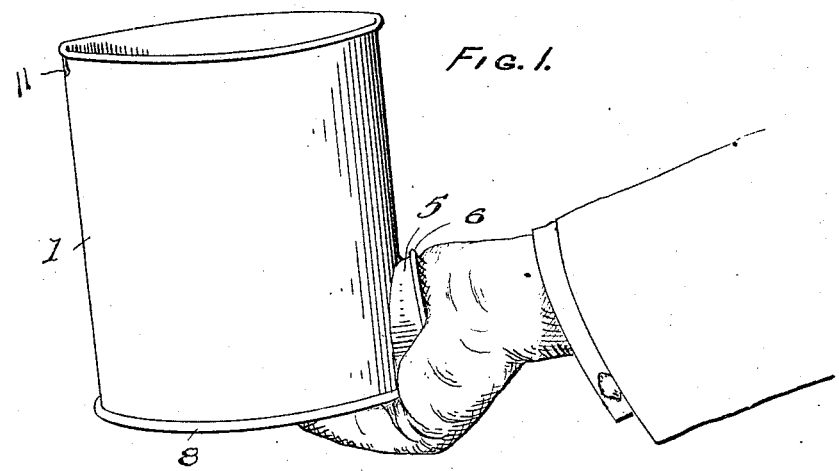
Figure 1 is a perspective view showing the manner of holding the receptacle or strainer in the hand, while conveying the accumulated garbage to a garbage can.

In the drawings herewith I have illustrated the receptacle as a cylindrical vessel as 1, but it will be understood that other forms or shapes may be adopted for the receptacle, and that it may be manufactured in various sizes for different uses. The device of the invention may be produced at comparatively inexpensive cost from metals such as tin, galvanized iron, black iron, enamel ware, aluminum, copper, &c., as a marketable article, either for domestic use, or for dining rooms and other public eating places, where such an article is adapted for kitchen use.

The upper end of the receptacle is open, while its lower portion is provided with an elevated bottom 2, extending substantially transversely of the receptacle, but preferably oblique or inclined to the vertical axis of the vessel. The bottom 2 declines toward a sump or concave portion 3 of the bottom, adjacent to a portion of the rounded wall of the receptacle, and complementary to this sump the wall of the vessel is perforated to form a strainer 4 for the passage through this strainer of liquids from the interior of the receptacle. This strainer is provided in the wall of the receptacle by means of a suitable tool or punch for stamping out the perforations over a preferably circular area of the receptacle wall, and the strainer as will be noted is located at the lowest portion of the elevated, but inclined bottom 2 of the receptacle.

A laterally extending, exterior spout 5, is soldered or otherwise affixed to the surface of the receptacle wall, and surrounds the strainer portion 3, said spout, as shown, being preferably an open annular sleeve or circular flange, and fashioned with a ring or annular bead 6 at its free edge, against which the hand may be closed, as indicated in Figure 1.

Below the elevated bottom portion 2 of the receptacle the circular wall thereof forms a space 7, and the lower edge of this circular wall is fashioned with a bead 8 at its edge, to afford either a support for the receptacle, or insure a smooth surface for the hand while grasping the receptacle as in Figure 1.

At the underside of the bottom 2, and within the space 7, a transversely extending finger bar or blade 9, is attached, which bar is secured to the underside of the bottom and to the inner side wall of the receptacle below the bottom, as by soldering, or in other suitable manner.

Figure 3:
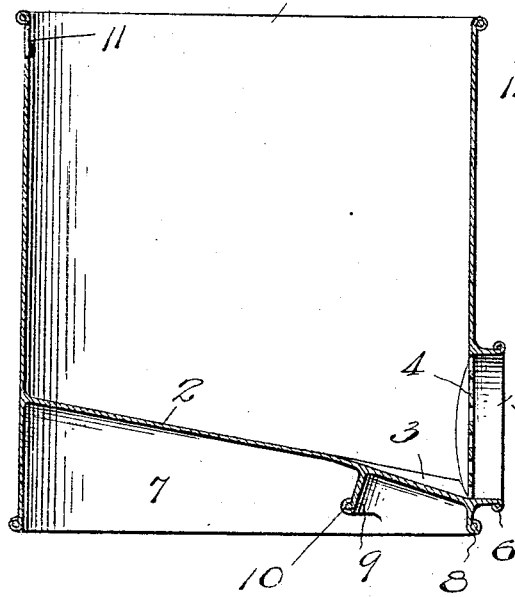
Figure 3 is a vertical, central, sectional view of the sink strainer or utensil, at line 3—3 of Figure 2.
Figure 2:
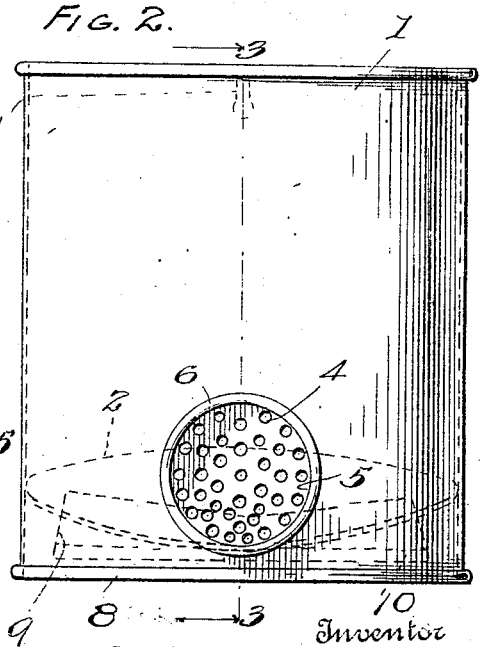
Figure 2 is a front elevation of the sink strainer made according to my invention, showing some parts in dotted lines.

As best seen in Figure 3, and shown in dotted lines in Figure 2, the finger bar at its lower edge is fashioned with a rounded bead 10, and terminates above the bottom edge or bead 8 of the receptacle, in order that the fingers may be turned up under the bead 8 of the receptacle and grasp firmly the beaded finger-bar, as indicated in Figure 1.

At the back of the receptacle, and near its upper edge a suspending slot 11 is provided by means of which the receptacle may be hung up on a nail, tack, or hook.

In use the device may be suspended by its hook-slot 11 over the sink, or the receptacle may be placed on the drain-board at the side of the sink, as usually found in kitchens, but in any event, the receptacle is so positioned that the liquid contents may drain through the strainer portion 4 into the sink. Thus as the dishes and plates are cleansed, preparatory to washing, the waste materials, including both liquids and solids, are placed in the receptacle. The liquids drain through the solid materials to the inclined bottom 2 and are thereby conveyed to the sump 3, or pass through the strainer before reaching the bottom 2, and finally pass through the strainer and exterior spout 5 to the sink.

The solid materials remaining in the receptacle may now be conveyed to the garbage-can and deposited therein. For this purpose the receptacle is grasped by first closing the palm of the hand over the open spout, as in Figure 1, the fingers are passed under the lower edge of the receptacle and are made to grasp the finger-bar 9 to insure a firm hold on the receptacle. The finger points are forced up, at the left of the finger bar in Figure 3, against the underside of the bottom 2, and pressure between the fingers on the bar and the palm of the hand on the open spout, insure convenience and ease in holding and supporting the receptacle, and for the purpose of inverting the receptacle to empty its contents. The palm of the hand of course effectually closes the spout to prevent dripping of any liquids that may remain in the receptacle.

Changes and alterations as to size, shape, or form of the illustrated and described device are contemplated, and other changes may be made if desired, within the scope of my appended claims without departing from the spirit of my invention. And while I have described the device as a sink strainer, it will of course be obvious that the device may be utilized for other purposes to which it is adapted.

Having thus fully described my invention, what I claim as new and desire to secure by Letters Patent is:

1. The combination with a receptacle having an inclined bottom and a liquid strainer in its wall above said bottom, of an exterior spout adjacent said strainer extending laterally above the bottom for use as a handle and adapted to be closed by the palm of the hand when grasping said receptacle.

2. The combination with a receptacle having an inclined bottom and a perforated portion in its wall forming a strainer, of an exterior spout extending laterally above the bottom and surrounding said strainer for use as a handle and adapted to be closed by the palm of the hand when grasping said receptacle.

3. The combination with a receptacle having an elevated, inclined, bottom and a perforated portion in its wall forming a strainer above said bottom, of a spout adjacent said strainer adapted to be closed by the hand, and means beneath the elevated bottom adapted to form a finger-hold for the hand while grasping the receptacle.

4. The combination with a receptacle having an elevated bottom and a liquid strainer in its wall above said bottom adapted to be closed by hand, and means beneath the elevated bottom adapted to form a finger-hold for the hand while grasping the receptacle.

5. The combination with a receptacle having an elevated, inclined bottom and a liquid strainer in its wall above said bottom, an exterior spout surrounding said strainer adapted to be closed by the palm of a hand, and a transversely extending finger-bar beneath said bottom to form a finger hold for the hand while grasping the receptacle.

CLYDE S. WHIPPLE.